United States Patent
Lee et al.

(10) Patent No.: US 9,726,879 B2
(45) Date of Patent: *Aug. 8, 2017

(54) VARIABLE LIQUID DEVICE HAVING UNEVEN CHANNEL AND APPARATUS INCLUDING THE SAME

(71) Applicant: SAMSUNG ELECTRONICS CO., LTD., Suwon-si (KR)

(72) Inventors: Eun-sung Lee, Hwaseong-si (KR);
Seung-wan Lee, Suwon-si (KR);
Jong-hyeon Chang, Suwon-si (KR);
Kyu-dong Jung, Suwon-si (KR);
Min-seog Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 451 days.

This patent is subject to a terminal disclaimer.

(21) Appl. No.: 14/190,844

(22) Filed: Feb. 26, 2014

(65) Prior Publication Data

US 2014/0240586 A1    Aug. 28, 2014

(30) Foreign Application Priority Data

Feb. 26, 2013 (KR) .................... 10-2013-0020658

(51) Int. Cl.
*G02B 26/02* (2006.01)
*G03B 9/02* (2006.01)
(Continued)

(52) U.S. Cl.
CPC ............ *G02B 26/004* (2013.01); *G03B 9/02* (2013.01); *H04N 5/238* (2013.01)

(58) Field of Classification Search
CPC ................................ G02B 26/004; G03B 9/02
See application file for complete search history.

(56) References Cited

U.S. PATENT DOCUMENTS

| 4,917,687 A | 4/1990 | O'Boyle |
| 7,256,943 B1 | 8/2007 | Kobrin et al. |
| (Continued) | | |

FOREIGN PATENT DOCUMENTS

| DE | 1020050047592 A1 * | 4/2007 | ............ G02B 5/005 |
| KR | 10-0931075 A | 12/2009 | |
| (Continued) | | | |

OTHER PUBLICATIONS

Heikenfeld et al., "Electrofluidic displays using Young-Laplace transposition of brilliant pigment dispersions", Nature Photonics, May 2009, pp. 292-296, vol. 3.

(Continued)

*Primary Examiner* — W B Perkey
(74) *Attorney, Agent, or Firm* — Sughrue Mion, PLLC (57) ABSTRACT

The variable liquid device includes: a chamber including a channel, in which a fluid flows, having an inconsistent height in at least a part of the channel; a first fluid filled in the chamber and formed of a non-transmissive material; and a second fluid filled in the chamber and formed of a light transmittable material that does not mix with the first fluid, wherein an aperture, through which light is transmitted, is adjusted according to a variation of an interface between the first fluid and the second fluid.

19 Claims, 8 Drawing Sheets

(51) Int. Cl.
*H04N 5/238* (2006.01)
*G02B 26/00* (2006.01)

(56) References Cited

U.S. PATENT DOCUMENTS

| | | | |
|---|---|---|---|
| 7,706,077 | B2 | 4/2010 | Batchko et al. |
| 7,735,945 | B1 | 6/2010 | Sliwa, Jr. et al. |
| 7,755,840 | B2 | 7/2010 | Batchko et al. |
| 8,087,778 | B2 | 1/2012 | Gupta et al. |
| 8,111,466 | B2 | 2/2012 | Rodriguez Fernández et al. |
| 9,151,945 | B2 * | 10/2015 | Chang .................... H04N 5/238 |
| 2013/0016515 | A1 * | 1/2013 | Chang ................ G02B 26/005 362/293 |
| 2014/0191107 | A1 * | 7/2014 | Lee ...................... G01J 1/0448 250/201.1 |
| 2014/0240586 | A1 * | 8/2014 | Lee ...................... H04N 5/238 348/362 |
| 2015/0130996 | A1 * | 5/2015 | Chang .................. H04N 5/238 348/370 |

FOREIGN PATENT DOCUMENTS

| | | |
|---|---|---|
| KR | 10-2010-0031114 A | 3/2010 |
| KR | 10-2010-004316 A | 4/2010 |
| KR | 10-2013-0009504 A | 1/2013 |
| WO | 2007/068705 A1 | 6/2007 |

OTHER PUBLICATIONS

Hongbin et al., "Optofluidic variable aperture", Optics Letters, Mar. 15, 2008, pp. 548-550, vol. 33, No. 6, Optical Society of America.

Muller et al., "An Optofluidic Concept for a Tunable Micro-iris", Journal of Microelectromechanical Systems, pp. 1477-1484, Dec. 2010, vol. 19, No. 6, IEEE.

Xu et al., "A novel adaptive mechanical-wetting lens for visible and near infrared imaging", Optics Express, pp. 12430-12435, vol. 1, No. 12, Jun. 7, 2010, Optical Society of America.

Barbulovic-Nad et al., "A microfluidic platform for complete mammalian cell culture", Lab on a Chip, pp. 1536-1542, vol. 10, No. 12, Jun. 21, 2010, ISSN 1473-0197, The Royal Society of Chemistry.

Duncan Graham-Rowe, "Liquid lenses make a splash", Nature Photonics, pp. 2-4, Sep. 2006, Nature Publishing Group.

Psaltis et al., "Developing optofluidic technology through the fusion of microfluids and optics", Nature, pp. 381-386, vol. 442, Jul. 27, 2006, Nature Publishing Group.

Hayes, et al., "Video-speed electronic paper based on electrowetting", Letters to Nature, Sep. 25, 2003, pp. 383-385, vol. 425, Nature Publishing Group.

Syms, et al., "Sliding-blade MEMS iris and variable optical attenuator", Journal of Micromechanics and Microengineering, Published Sep. 14, 2004, pp. 1700-1710, vol. 14, Online at stacks.iop.org/JMM/14/1700, IOP Publishing Ltd, UK.

* cited by examiner

VARIABLE LIQUID DEVICE HAVING UNEVEN CHANNEL AND APPARATUS INCLUDING THE SAME

CROSS-REFERENCE TO RELATED APPLICATION

This application claims priority from Korean Patent Application No. 10-2013-0020658, filed on Feb. 26, 2013, in the Korean Intellectual Property Office, the disclosure of which is incorporated herein in its entirety by reference.

BACKGROUND

1. Field

The present disclosure relates to a variable liquid device and an apparatus including the variable liquid device, and more particularly, to a variable liquid device including channels having inconsistent heights and an apparatus including the variable liquid device.

2. Description of the Related Art

A technology of adjusting and controlling light transmittance is widely applied to apertures or shutters in imaging apparatuses, or to drive pixels in image display apparatuses.

In a related art optical system, a variable aperture is operated by adjusting a plurality of metal blades; however, mechanical movements, frictional force, and usage of movable mechanical elements result in restricting miniaturization.

An electro-heating or an electrostatic micro-electromechanical system (MEMS) aperture has been suggested; however, an aperture (AD) unit is non-circular, there is a gap between blades, and a maximum aperture ratio with respect to an entire device area is low, 1% or less.

Owing to the development of an optofluidic technology combining micro-optics and microfluidics, a variable aperture adjusting an aperture ratio by deforming a polydimethylsiloxane (PDMS) membrane by using air pressure has been suggested. A resolution of the variable aperture has been improved by using a three-dimensional structure and a capillary force. Such a variable aperture has a higher AD ratio than that of the related art MEMS aperture; however, a syringe pump has to be used to drive the variable aperture.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

One or more of exemplary embodiments provide variable liquid devices capable of making a fluid flow in channels having uneven heights.

One or more of exemplary embodiments also provide variable liquid devices capable of controlling a location of the fluid by balancing Laplace pressure according to heights of channels.

According to an aspect of an exemplary embodiment, a variable liquid device includes: a chamber including a channel, in which a fluid flows, having an inconsistent height in at least a part of the channel; a first fluid filled in the chamber and formed of a non-transmissive material; and a second fluid filled in the chamber and formed of a light transmittable material that does not mix with the first fluid, wherein an aperture, through which light is transmitted, is adjusted according to a variation of an interface between the first fluid and the second fluid.

The first fluid may move symmetrically about a center axis of the variable liquid device.

The first fluid may be expanded or reduced as a concentric loop in the chamber.

The chamber may include: a first channel in which the first and the second fluid flow; a second channel in which the first fluid flows; and a third channel connecting the first channel and the second channel to each other.

At least a part of a surface in the first channel may be non-planar.

A height of the first channel may be uneven in a direction perpendicular to the center axis of the variable liquid device.

The height of the first channel may be formed to be symmetric about the center axis of the variable liquid device.

The height of the first channel may decrease toward the center axis of the variable liquid device.

The chamber may include: a first substrate; a second substrate facing the first substrate and apart from the first substrate; a third substrate facing the second substrate and apart from the second substrate; a first spacer configured to separate the first and second substrates from each other; and a second spacer configured to separate the second and third substrates from each other.

The first substrate and the second substrate may not be in parallel with each other.

The first channel, in which the first and second fluids flow, may be formed by the first substrate, the second substrate, and the first spacer, and the second channel, in which the second fluid flows, may be formed by the second substrate, the third substrate, and the second spacer.

A through hole may be further formed in a center portion of the second substrate.

At least one of the first fluid and the second fluid may flow along the through hole.

The aperture may be a region of the second fluid surrounded by the first fluid.

The variable liquid device may further include an electrode unit, to which a voltage is applied to form an electric field in the channel, disposed on an inner side surface of the channel, wherein the location of the interface is changed according to the electric field.

The first fluid may be a liquid metal or a polar liquid.

The variable liquid device may further include an actuator contacting the first fluid and having a size that varies depending on the voltage application, wherein the location of the interface is changed according to a size of the actuator.

The variable liquid device may further include a reservoir storing a third fluid, wherein the location of the interface may be changed according to inflow or outflow of the third fluid into or from the channel.

According to another aspect of an exemplary embodiment, an imaging apparatus includes: the variable liquid device; a focusing unit for forming an image of an object from light incident through the variable liquid device; and an imaging device converting the image formed by the focusing unit into an electric signal.

According to another aspect of an exemplary embodiment, an image display apparatus includes: a light source unit for providing light; and a display panel for adjusting the transmittance of the light provided from the light source unit according to image information, the display panel including an array of a plurality of variable liquid devices described above.

BRIEF DESCRIPTION OF THE DRAWINGS

The above and/or other aspects will become more apparent by describing certain exemplary embodiments, with reference to the accompanying drawings, in which.

DETAILED DESCRIPTION

Certain exemplary embodiments are described in greater detail below with reference to the accompanying drawings.

In the following description, the same drawing reference numerals are used for the same elements even in different drawings. The matters defined in the description, such as detailed construction and elements, are provided to assist in a comprehensive understanding of exemplary embodiments. Thus, it is apparent that exemplary embodiments can be carried out without those specifically defined matters. Also, well-known functions or constructions are not described in detail since they would obscure exemplary embodiments with unnecessary detail.

As used herein, the term "and/or" includes any and all combinations of one or more of the associated listed items. Expressions such as "at least one of," when preceding a list of elements, modify the entire list of elements and do not modify the individual elements of the list.

Figure 1:
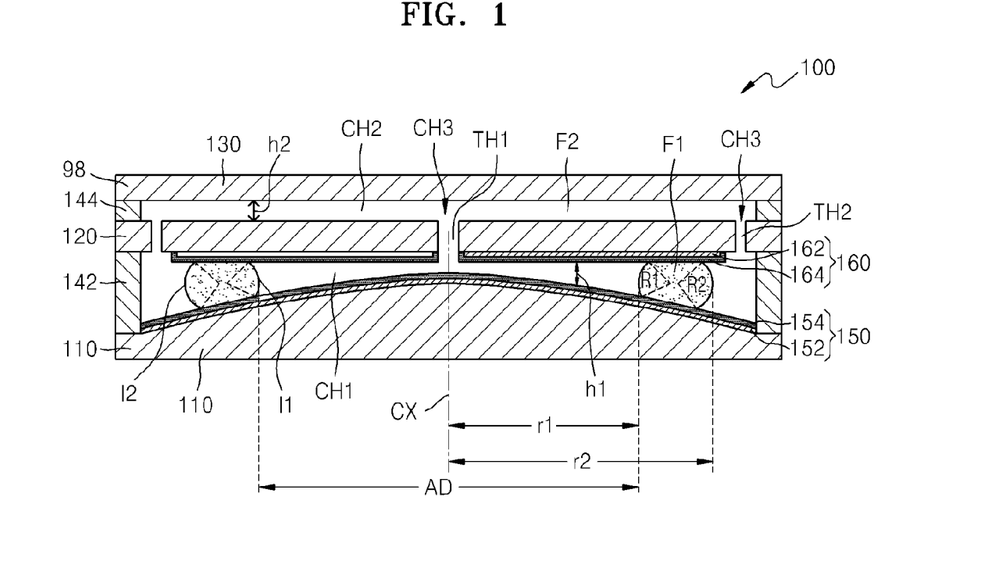
FIG. 1 is a cross-sectional view of a variable liquid device according to an exemplary embodiment.
Figure 2:
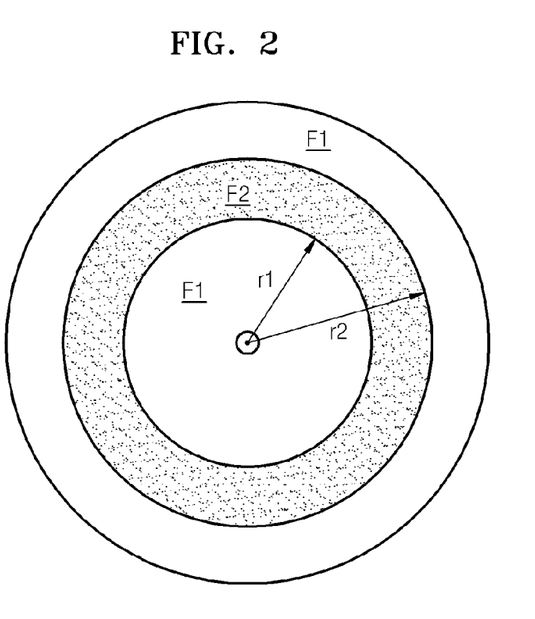
FIG. 2 is a plan view showing fluids filled in a first channel of the variable liquid device of FIG. 1.

FIG. 1 is a cross-sectional view of a variable liquid device 100 according to an exemplary embodiment. FIG. 2 is a plan view showing fluids filled in a first channel CH1 of the variable liquid device 100 shown in FIG. 1.

Referring to FIGS. 1 and 2, the variable liquid device 100 includes a chamber 98 forming a space in which fluids flow, a first fluid F1 filled in the chamber and formed of a non-transmissive material, and a second fluid F2 filled in the chamber and formed of a non-transmissive material so as not to mix with the first fluid F1. According to the variable liquid device 100 of the present exemplary embodiment, an aperture AD through which light transmits may be adjusted by variation of an interfacial location between the first fluid F1 and the second fluid F2.

The chamber may include a first channel CH1 in which the first and second fluids F1 and F2 flow, a second channel CH2 in which the first fluid F1 may flow, and one or more third channels CH3 connecting the first and second channels CH1 and CH2 to each other. A height h1 or h2 of at least one of the first and second channels CH1 and CH2 may be variable to be symmetric about a center axis cx of the variable liquid device 100. For example, the height h1 of the first channel CH1 may be reduced or increased toward the center axis cx of the variable liquid device 100. In FIG. 1, the height h1 of the first channel CH1 decreases toward the center axis cx of the variable liquid device 100; however, an exemplary embodiment is not limited thereto.

At least one of the first and second channels CH1 and CH2 is processed to completely have a hydrophobic inner surface, or to partially have hydrophilic patterns on some parts thereof.

In more detail, the chamber includes a first substrate 110, a second substrate 120 separated from the first substrate 110, a third substrate 130 separated from the second substrate 120, a first spacer 142 surrounding a space between the first and second substrates 110 and 120 to form the first channel CH1, and a second spacer 144 surrounding a space between the second and third substrates 120 and 130 to form the second channel CH2.

A first through hole TH1 is formed in a center portion of the second substrate 120, and a second through hole TH2 is formed in a peripheral portion of the second substrate 120 to connect the first and second channels CH1 and CH2 to each other. The first and second through holes TH1 and TH2 form third channels CH3. A cross-sectional area of the first through hole TH1 is less than that of the second through hole TH2; however, an exemplary embodiment is not limited thereto.

The first, second, and third substrates 110, 120, and 130 may be formed of a light transmittable material.

The first fluid F1 is a non-transmissive fluid flowing in the second channel CH2. The first fluid F1 may show a minimum volume variation or no volume variation. A liquid metal or a polar liquid may be used as the first fluid F1. For example, a liquid metal such as Hg or a solution in which a dye is dissolved to be suitable for absorbing wavelength may be used as the first fluid F1. Such a dye may be, for example, carbon black absorbing visible ray wavelengths.

The second fluid F2 is a light transmittable fluid that may flow in the first and second channels CH1 and CH2 and the first and second through holes TH1 and TH2. The second fluid F2 may be, for example, vapor or non-polar liquid.

Thus, as shown in FIGS. 1 and 2, the first fluid F1 may be filled in the first channel CH1 in a concentric loop shape. An interface between the first fluid F1 and the second fluid F2 in FIG. 2 is realized by connecting points at equal heights in the first channel CH1, and the above contour line may not be necessarily circular, and may be formed in various shapes. The second fluid F2 flows to the first channel CH1 or the second channel CH2 via the first and second through holes TH1 and TH2 according to the flow of the first fluid F1.

The first and second fluids F1 and F2 may form a fluid interface in the first channel CH1. The fluid interface may be classified as a first interface I1 between the second fluid F2 and the first fluid F1 disposed in a center portion of the first channel CH1, and a second interface I2 between the second fluid F2 and the first fluid F1 disposed in an edge portion of the first channel CH1. A region defined by an interface closer to the center axis cx, that is, the first interface I1, may define an aperture AD of the variable liquid device 100.

Although it is described that the first fluid F1 only flows in a certain region of the first channel CH1, an exemplary embodiment is not limited thereto. The first fluid F1 may flow to the second channel CH2 via the second through hole TH2. In this case, the aperture AD of the variable liquid device 100 may be a region formed by the interface that is closer to the center axis cx of the variable liquid device 100, between the first interface I1 and the second interface I2.

Also, the variable liquid device 100 may further include an electrode unit to which a voltage is applied to form an electric field in the first channel CH1. The electrode unit may include a first electrode unit 150 formed on the first substrate 110, and a second electrode unit 160 formed on the second substrate 120 to face the first electrode unit 150. The first and second electrode units 150 and 160 may respectively include electrode layers 152 and 162 and insulating layers 154 and 164 covering the electrode layers 152 and 162. Also, a region of a surface of an insulating layer in a channel may be coated with a hydrophobic film, and the remaining region may be coated with a hydrophilic film. In particular, a region on which the first fluid F1 always exists in the channel may be coated with a hydrophilic film.

Therefore, when electrowet-driving the variable liquid device 100, Laplace pressure P1 generated by a radius of curvature R1 at the first interface I1 and a distance r1 between the first interface I1 and the center axis cx and Laplace pressure P2 generated by a radius of curvature R2 at the second interface I2 and a distance r2 between the second interface I2 and the center axis cx are applied to both interfaces I1 and I2, the first fluid F1 is fixed at a certain location where Laplace pressure P1 is equal to Laplace pressure P2 at a certain contact angle.

In particular, the electric field is generated in the first channel CH1 by the voltage applied to the electrode unit, a contact angle between the first fluid F1 and the second channel CH2 is changed according to an intensity of the electric field, and the radiuses of curvature R1 and R2 at the first and second interfaces I1 and I2 are also changed. Then, a difference between the Laplace pressures at the first and second interfaces I1 and I2 may be generated, and the first fluid F1 is moved to a point where the Laplace pressures P1 and P2 are balanced. Thus, the distance r1 between the first interface I1 and the center axis cx of the variable liquid device 100 and the distance r2 between the second interface I2 and the center axis cx of the variable liquid device 100 are also changed. Since the radiuses of curvature R1 and R2 at the first and second interfaces I1 and I2 are relatively much less than the distances r1 and r2, the Laplace pressures P1 and P2 largely affect the radiuses of curvature R1 and R2.

Thus, when the radiuses of curvature R1 and R2 at the first and second interfaces I1 and I2 are balanced due to the voltage application, the distance r1 between the first interface I1 and the center axis cx and the distance r2 between the second interface I2 and the center axis cx are determined. After that, the movement of the first fluid F1 is stopped at a point where the Laplace pressures are balanced with each other. Thus, the distance r1 between the first interface I1 and the center axis cx of the variable liquid device 100 may become the aperture AD.

When the Laplace pressures are balanced at a certain voltage applied to the first fluid F1, the contact angles between the first fluid F1 and opposite surfaces of the first channel CH1 are consistent. Thus, the radiuses of curvature R1 and R2 at the first and second interfaces I1 and I2 are determined by the height h1 of the first channel CH1. Therefore, if the height h1 of the first channel CH1 is formed inconsistently to be symmetric about the center axis cx of the variable liquid device 100 in a direction perpendicular to the center axis cx, the second fluid F2 may be formed in a concentric loop shape formed by connecting points where the Laplace pressures are equal to each other. That is, the second fluid F2 may be expanded or contracted while maintaining the concentric loop shape according to the magnitude of the applied voltage. If the height h1 of the channel CH1 is different at the interfaces I1 and I2 , there is a difference between the Laplace pressures that drives the second fluid F2 to find a balanced point, and thus, the aperture AD may be formed in a circular shape based on the center axis cx of the variable liquid device 100. Therefore, as a variation amount of the channel height h1 in the radial direction from the center axis cx is increased, the size of the aperture AD may be controlled effectively.

On the other hand, if the height h1 of the first channel CH1 is consistent in a direction perpendicular to the center axis cx of the variable liquid device 100 without regard to the distance from the center axis cx, the contact angles between the first fluid F1 and the first channel CH1 are consistent without regard to the locations of the first and second interfaces I1 and I2. Thus, there may be a plurality of points in the first channel CH1 where the Laplace pressures are balanced. That is, the distance r1 between the center axis cx of the variable liquid device 100 and the first interface I1 may be various ones, and thus, the aperture AD is not formed in a circular shape. Also, a center of the aperture AD defined by the first interface I1 may not coincide with the center axis cx of the variable liquid device 100.

A transverse cross-sectional shape of the first substrate 110, which determines the consistency of the height h1 of the first channel CH1, corresponds to the shape of the aperture AD. For example, if the first substrate 110 is formed to be convex to be symmetric about the center axis cx of the variable liquid device 100, a transverse cross-section of the convex portion of the first substrate 110 is formed in a circular shape. Thus, the first aperture AD has a circular shape.

However, if the transverse cross-section of the convex portion of the first substrate 110 is formed in a polygonal shape such as a square shape or an oval shape, the aperture AD may be also formed in a polygonal shape or an oval shape. Otherwise, if the transverse cross-section of the convex portion has a variable shape according to height, the aperture AD may be formed to be variable according to the location of the interface between the first and second fluids F1 and F2.

Figure 3A:
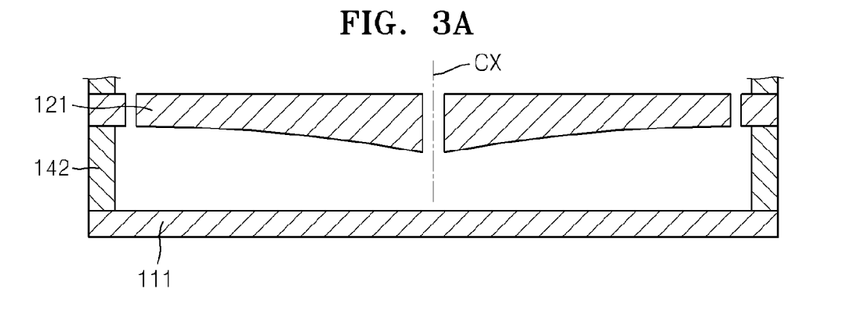
FIGS. 3A, 3B, and 3C are cross-sectional views showing examples of the variable liquid device.
Figure 3B:
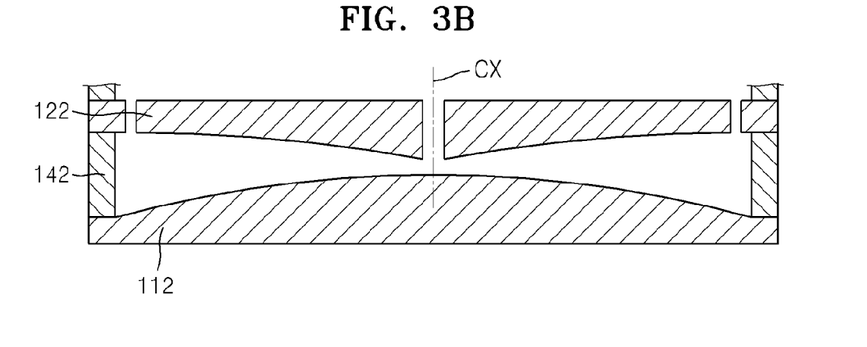
Figure 3C:
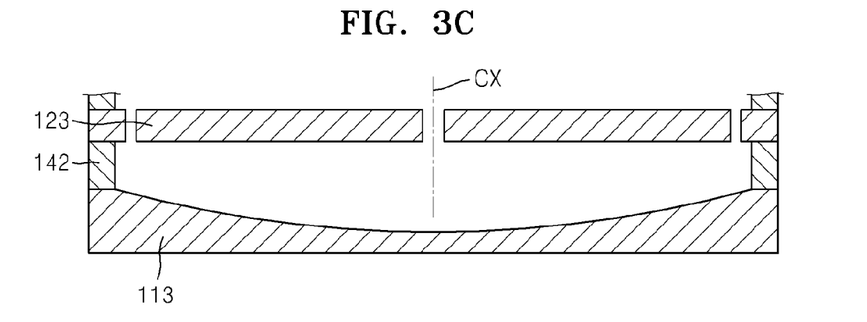

FIGS. 3A through 3C are diagrams showing modified examples of the first channel CH1 applied in the variable liquid device 100 of FIG. 1.

As shown in FIG. 3A, a second substrate 121 may be convex toward a first substrate 111 so that the height h1 of the first channel CH1 may increase from the center axis cx of the variable liquid device 100 toward the edge portion of the variable liquid device 100. Otherwise, as shown in FIG. 3B, both of first and second substrates 112 and 122 may be formed to be convex, with respect to one another, so that the height h1 of the first channel CH1 may be increased from the center axis cx of the variable liquid device 100 to the edge portion of the variable liquid device 100.

As described above, if the height h1 of the first channel CH1 increases from the center axis cx toward the edge portion of the variable liquid device 100, a variable amount of the variable liquid device 100 at the center axis cx may increase with a less amount of the first fluid F1 when compared with the above example.

Moreover, as shown in FIG. 3C, a first substrate 113 may be concave toward a second substrate 123. In this case, the aperture AD of the variable liquid device 100 has a minimum size at an initial stage. The second fluid F2 reduces a variable amount of the fluid at the center axis cx of the variable liquid device 100, and accordingly, a flow speed is lowered.

Figure 4A:
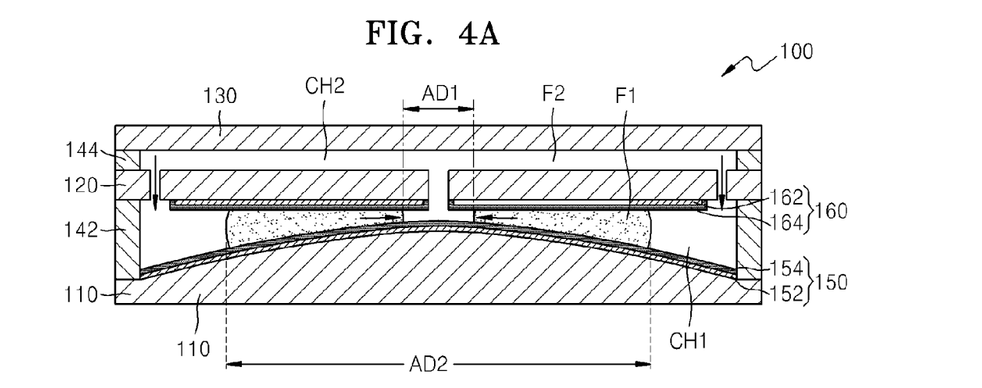
FIGS. 4A and 4B are cross-sectional views showing operations of the variable liquid device that adjusts light transmittance.
Figure 4B:
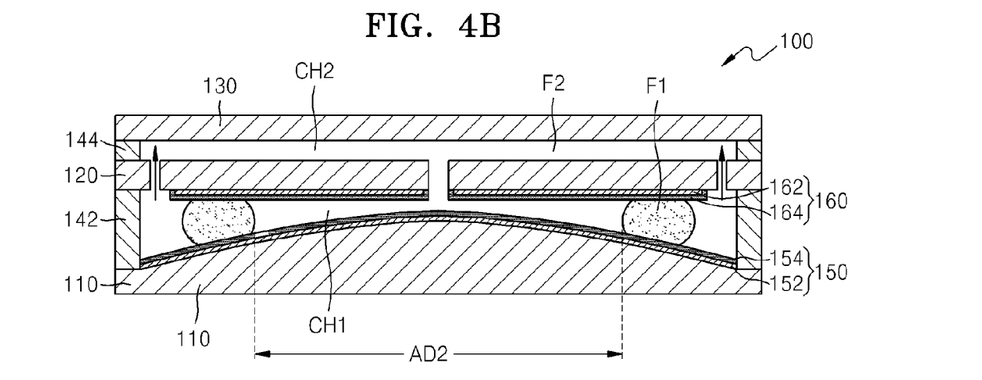

FIGS. 4A and 4B are diagram showing operations of the variable liquid device 100 of FIG. 2 that adjusts light transmittance, wherein different aperture diameters AD1 and AD2 are formed.

Electrowetting denotes a phenomenon that a contact angle of an electrolyte droplet is changed when a voltage is applied to the electrolyte droplet on an electrode coated with an insulating material. That is, the contact angle varies depending on interfacial tensions of the fluid, the droplet, and the insulating material at a three-phase contact line (TCL) where the fluid, the droplet, and the insulating material contact each other. When the electrowetting phenomenon is used, movement of the fluid may be controlled fast and effectively by using a voltage, and conveying and controlling of the fluid may be performed reversibly.

When a voltage is applied to the first and second electrode units 150 and 160, a contact angle between the first fluid F1 and the first channel CH1 is changed, and accordingly, the radiuses of curvature R1 and R2 at the first and second interfaces I1 and I2 are also changed. When the radiuses of curvature R1 and R2 of the first and second interfaces I1 and I2 are changed, a difference between the Laplace pressures at the first and second interfaces I1 and I2 is generated, thereby moving the first fluid F1 to a center of the first channel CH1 and the aperture AD is reduced. The flow of the first fluid F1 is stopped at a point where the Laplace pressures are balanced with each other. When the first fluid F1 flows to the center of the first channel CH1, the second fluid F2 existing at the center of the first channel CH1 is moved to the second channel CH2 via the first through hole TH1, and the second fluid F2 existing in the second channel CH2 may be moved to the edge portion of the first channel CH1 via the second through hole TH2. Therefore, as shown in FIG. 4A, an aperture diameter AD1 is formed.

When a magnitude of the voltage applied to the first and second electrode units 150 and 160 decreases, the contact angle returns to the original value, and the first fluid F1 is moved to the edge portion of the first channel CH1, thereby enlarging the aperture AD. The movement of the first fluid F1 is stopped at a point where the Laplace pressures are balanced with each other. When the first fluid F1 flows to the edge portion of the first channel CH1, the second fluid F2 is moved to the second channel CH2 via the second through hole TH2, and the second fluid F2 existing in the second channel CH2 may be moved to the center of the first channel CH1 via the first through hole TH1. Therefore, as shown in FIG. 4B, an aperture diameter AD2 is obtained. The above phenomenon may vary depending on a channel structure and a droplet amount.

If the first channel CH1 of variable height, according to an exemplary embodiment, is symmetric about the center axis cx of the variable liquid device 100, the first fluid F1 may be expanded or reduced in a loop shape based on the center axis cx of the variable liquid device 100. The movement of the first fluid F1 may be controlled only by the magnitude of the voltage, and thus, it is easy to manufacture the variable liquid device 100, and accordingly, the aperture AD may be controlled in an analog manner by changing the magnitude of the voltage.

In the above description, the first fluid F1 formed of the non-transmissive material has a polar property and the second fluid F2 formed of the light transmittable material has a non-polar property, as an example; however, the first fluid F1 may have a non-polar property and the second fluid F2 may have a polar property. In this case, the electrode unit may be disposed on the second channel CH2.

Figure 5:
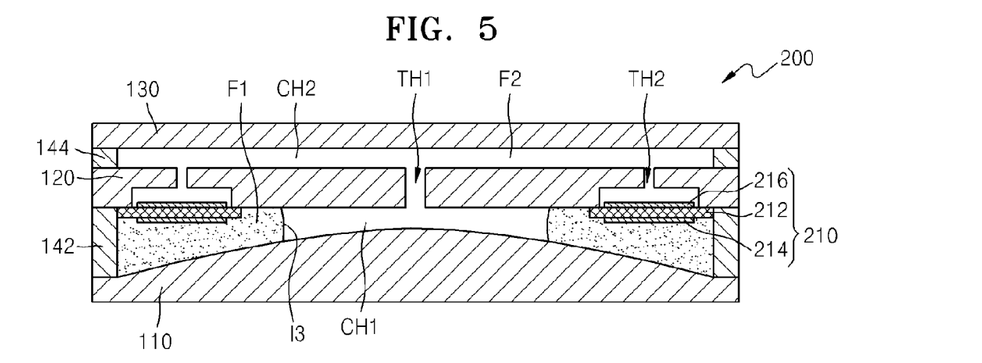
FIG. 5 is a cross-sectional view of a variable liquid device according to an exemplary embodiment.

FIG. 5 is a cross-sectional view of a variable liquid device 200 according to an exemplary embodiment.

Like the variable liquid device 100 shown in FIG. 1, the variable liquid device 200 of FIG. 5 includes a chamber forming a space in which fluids flow; a first fluid F1 filled in the chamber and formed of a non-transmissive material, and a second fluid F2 filled in the chamber and formed of a light transmittable material so as not to mix with the first fluid F1.

In the chamber, the first channel CH1 is formed by the first substrate 110, the second substrate 120, and the first spacer 142, and the second channel CH2 may be formed by the second substrate 120, the third substrate 130, and the second spacer 144. In addition, the first through hole TH1 is formed in a center region of the second substrate 120, and the second through hole TH2 is formed in the peripheral portion of the second substrate 120 to connect the first and second channels CH1 and CH2 to each other.

The first fluid F1 is a non-transmissive fluid filled in the first channel CH1, and the second fluid F2 is a light transmittable fluid filled in a region of the first channel CH1, the first and second through holes TH1 and TH2, and the second channel CH2.

In the variable liquid device 200 of FIG. 5, an actuator 210 for moving the first fluid F1 may be disposed at an edge portion of the first channel CH1. The actuator 210 may include an elastic polymer layer 212 disposed between the third and fourth electrode layers 215 and 216.

The elastic polymer layer 212 may have a non-transmissive property, as well as transformability and elasticity. The elastic polymer layer 212 may have a mechanical rigidity so that the elastic polymer layer 212 hardly elastically deforms due to the Laplace pressure induced on a third interface I3. The elastic polymer layer 212 may include an electroactive polymer such as silicon, polysiloxane, polyurethane, polysilicon-urethane, rubber, ethylene-vinyl acetate copolymer, phenolic nitrile rubber, styrene butadiene rubber, polyether block amide, or polyvinylidene difluoride (PVDF), polyolefin, various gels, and other similar materials.

Figure 6A:
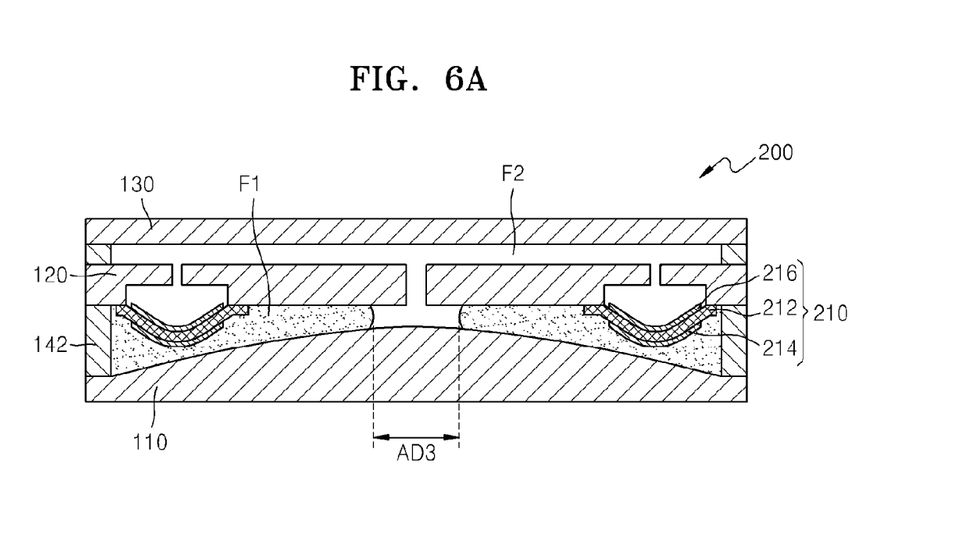
FIGS. 6A and 6B are cross-sectional views showing operations of the variable liquid device.
Figure 6B:
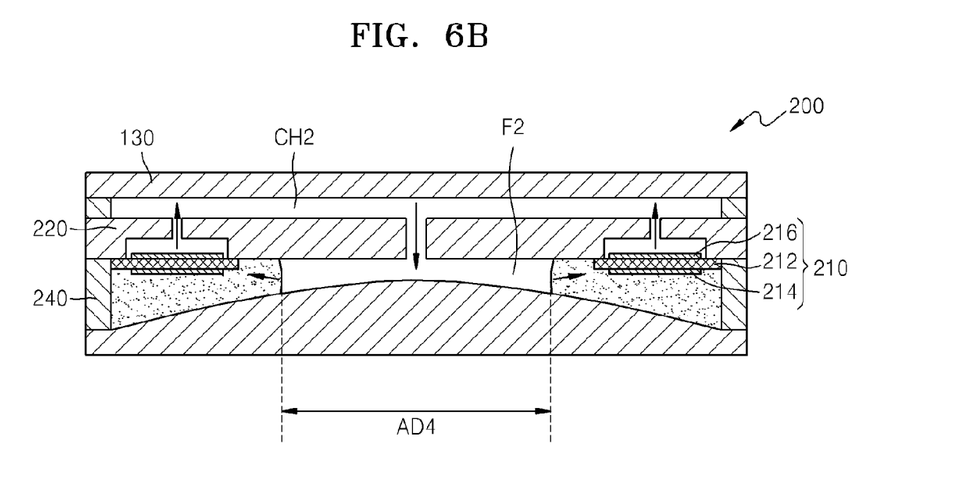

FIGS. 6A and 6B are diagrams showing operations of the variable liquid device 200 of FIG. 5 that adjusts light transmittance, wherein different aperture diameters AD3 and AD4 are formed.

When a voltage is applied to the third electrode layer 214 and the fourth electrode layer 216, the elastic polymer layer 212 disposed between the third and fourth electrode layers 214 and 216 expands to be curved toward the inside of the first channel CH1. Due to the deformation of the elastic polymer, the first fluid F1 is compressed, and then, the first fluid F1 flows toward the center of the first channel CH1 and different aperture diameters AD3 and AD4 may be formed. The third interface I3 exists between the second fluid F2 filled in the center region of the first channel CH1 and the first fluid F1. Although there is Laplace pressure that is applied to the third interface I3, the other interfaces between the second fluid F2 and the first fluid F1 are blocked by the elastic polymer layer 212 and the Laplace pressure is not applied to the other interfaces. The Laplace pressure applied to the third interface I3 determines a shape of an aperture. That is, when the height h1 of the channel CH1 is changed, the Laplace pressure differs, and thus, the first and second fluids F1 and F2 flow so as to balance the Laplace pressure.

When the voltage applied to the elastic polymer layer 212 is removed, as shown in FIG. 6B, the elastic polymer layer 212 returns to the original state thereof due to the elastic force. Then, the first fluid F1 flows to the edge portion of the first channel CH1, and thus, the aperture diameter AD4 is obtained.

If the first channel CH1 is formed symmetric about the center axis cx of the variable liquid device 200 and is uneven in a direction perpendicular to the center axis cx of the variable liquid device 200, the first fluid F1 may be expanded or reduced as a loop type based on the center axis cx of the variable liquid device 200 so that the circular shape of the aperture AD is maintained.

In the above-described variable liquid devices 100 and 200, an aperture is adjusted by the magnitude of the applied voltage; however, an exemplary embodiment is not limited thereto. That is, the aperture may be adjusted by the inflow or outflow of the additional fluid.

Figure 7A:
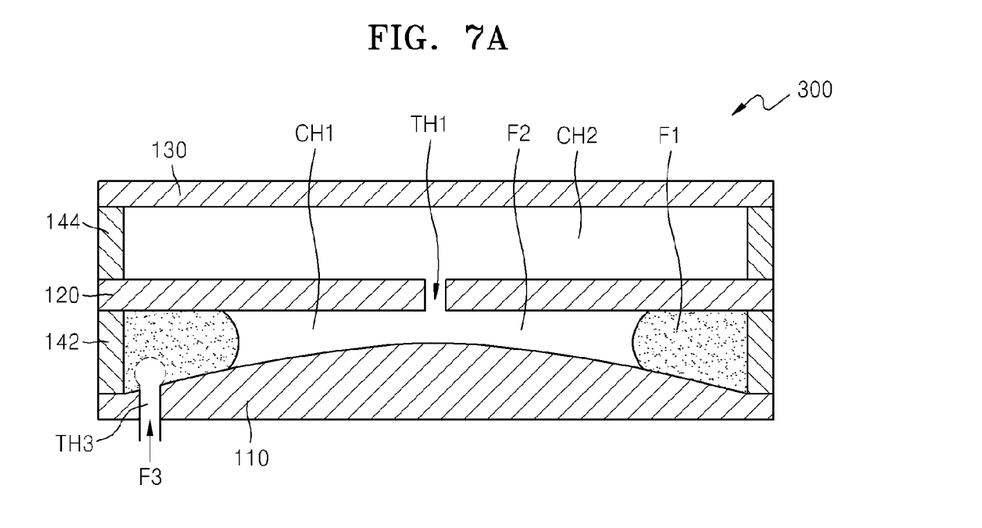
FIGS. 7A, 7B, and 7C are cross-sectional views schematically showing a variable liquid device according to an exemplary embodiment.
Figure 7B:
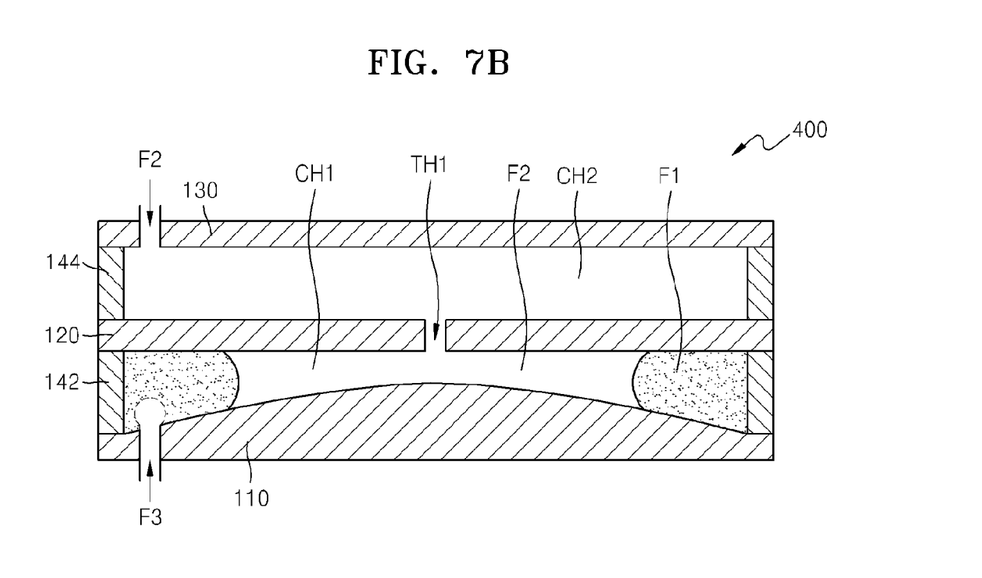
Figure 7C:
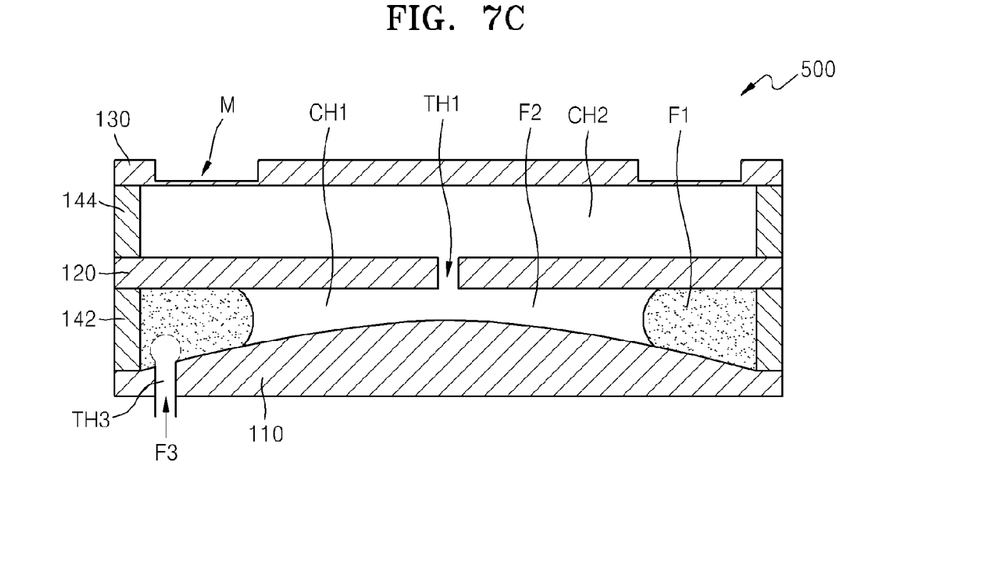

FIGS. 7A through 7C are cross-sectional views of variable liquid devices 300, 400, and 500 according to an exemplary embodiment.

The first substrate 110 of the variable liquid device 300 shown in FIG. 7A may include a third through hole TH3 that is connected to a reservoir (not shown) in which a third fluid F3 is stored. The third fluid F3 may be the same as the first fluid F1, or may be a fluid that does not mix with the first fluid F1. If the third fluid F3 is a fluid that does not mix with the first fluid F1, the first fluid F1 and the third fluid F3 may be partitioned by an elastic membrane denoted by a dashed line. When the third fluid F3 is induced due to pressure, the first fluid F1 in the first channel CH1 moves to the center of the first channel CH1, and the interface between the first fluid F1 and the second fluid F2 is stopped at a point where the Laplace pressure is balanced. If the first channel CH1 is formed to be symmetric about the center axis cx of the variable liquid device 300 and uneven in a direction perpendicular to the center axis of the variable liquid device 300, the first fluid F1 is expanded or reduced as a loop based on the center axis cx of the variable liquid device 300, and the aperture AD may be maintained circular.

In addition, referring to FIG. 7A, only the first through hole TH1 through which the second fluid F2 flows between the first channel CH1 and the second channel CH2 is formed. Thus, the second fluid F2 may be compressed or expanded by the movement of the first fluid F1. That is, the second fluid F2 is moved so as to balance the pressure of the second fluid F2 that is compressed or expanded and the third fluid F3.

Therefore, as shown in FIG. 7B, the second channel CH2 may be connected to a reservoir in which the first fluid F2 is stored through the third substrate 130. Otherwise, as shown in FIG. 7C, the third substrate 130 may include an elastic membrane M that elastically compensates for the compression and expansion of the second fluid F2. Also, a height of the second channel CH2 may be greater than that of the first channel CH1 in order to adjust the pressure variation of the second fluid F2 that is compressed or expanded.

Figure 8:
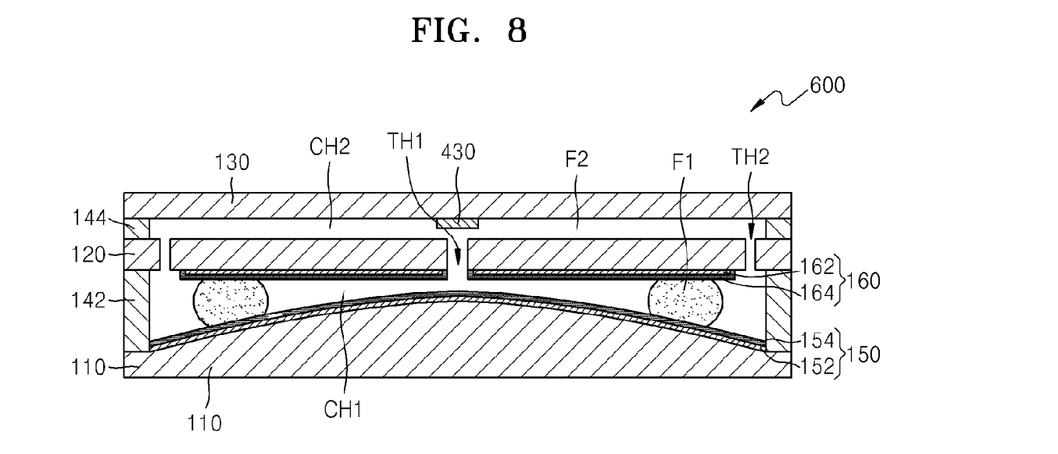
FIG. 8 is a cross-sectional view of a variable liquid device according to an exemplary embodiment.

FIG. 8 is a cross-sectional view of a variable liquid device 600 according to an exemplary embodiment.

The variable liquid device 600 of the present exemplary embodiment is different from the variable liquid device 100 in that the variable liquid device 600 may serve as a shutter in which the aperture AD is completely closed. An opaque pattern unit 430 is further formed on a center of the third substrate 130 to block the light transmitted through the first channel CH1 and the second channel CH2. The opaque pattern unit 430 may have a size corresponding to a minimum size of the aperture AD, which is determined by the flow of the second fluid F2 and the first fluid F1. That is, when an aperture having a minimum aperture diameter AD is formed by the movement of the first fluid F1, the light transmitting through the aperture having a minimum aperture diameter AD is blocked by the opaque pattern unit 430. In the variable liquid devices 200 and 400 shown in FIGS. 5 and FIGS. 7A through 7C, the opaque pattern unit 430 may be also formed on the center of the third substrate 130 to block the light transmitting through the first channel CH1 and the second channel CH2. Also, the variable liquid device 200 or 400 shown in FIG. 5 or FIGS. 7A through 7C may perform as a shutter that is completely closed without using an opaque pattern unit, even though there is a first through hole TH1. That is, the first through hole TH1 may be shielded by the elastic force of the elastic polymer and the pressure of the third fluid F3, and may be opened in a concentric circular shape.

The above-described variable liquid device according to an exemplary embodiment may be applied as a variable aperture or a pixel shutter in an imaging apparatus or an image display apparatus.

Figure 9:
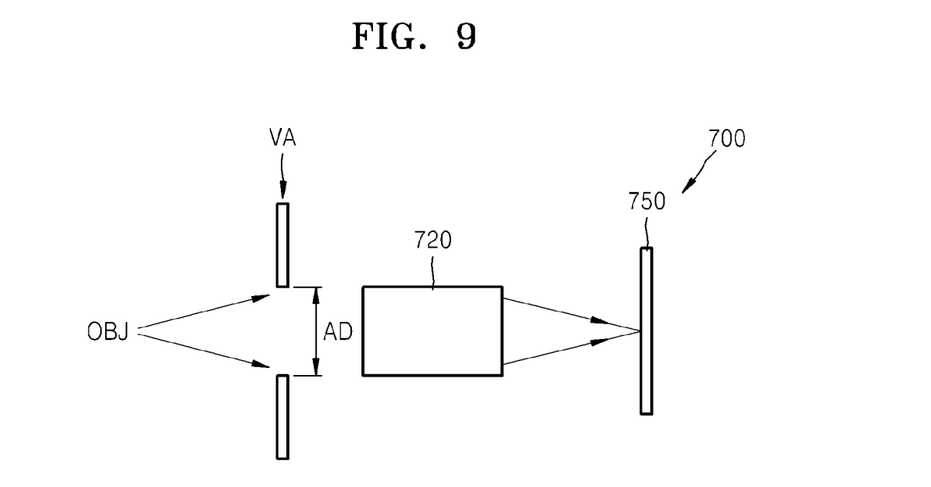
FIG. 9 is a schematic diagram of an image display apparatus according to an exemplary embodiment.

FIG. 9 shows a schematic configuration of an imaging apparatus 700 according to an exemplary embodiment.

The imaging apparatus 700 includes a variable aperture VA having a variable aperture diameter AD through which light from an object OBJ is incident, a focusing unit 720 forming an image of the object OBJ from the light incident through the variable aperture VA, and an imaging device 750 for converting the image formed by the focusing unit 720 into an electric signal.

The variable aperture VA may be any one of the above-described variable liquid devices, and the focusing unit 720 may include one or more lenses. A charge-coupled device (CCD) or a complementary metal-oxide semiconductor (CMOS) may be used as the imaging device 750.

Since the variable aperture VA may be micro-driven at a high speed due to a microelectrofluidic structure, the imaging apparatus 700 adopting the variable aperture VA may be suitable for a medical imaging apparatus, such as an optical coherence tomography (OCT) apparatus or a microscope.

Figure 10:
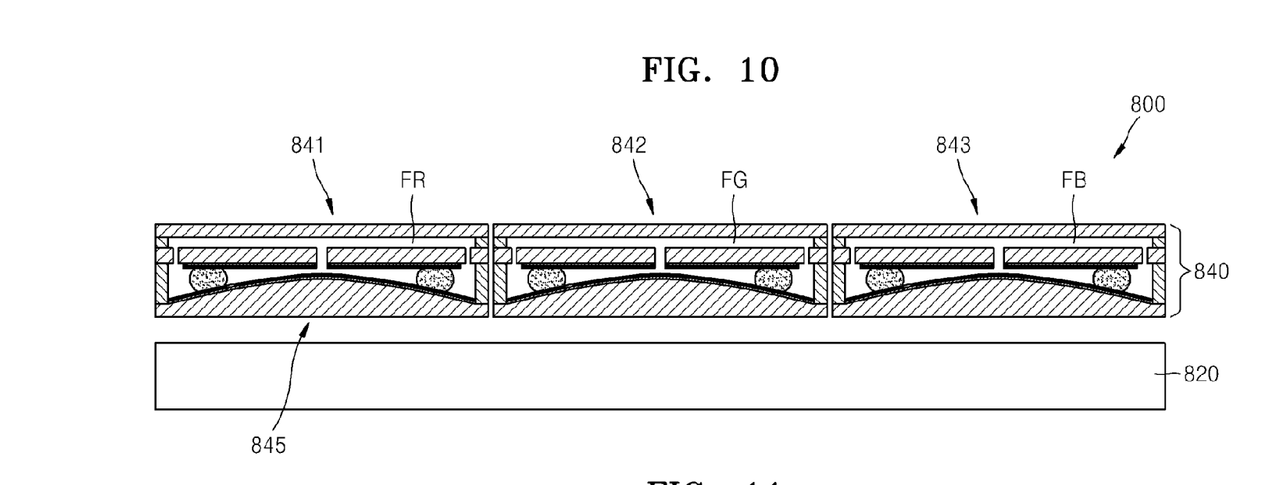
FIG. 10 is a schematic diagram of an image display apparatus according to an exemplary embodiment.

FIG. 10 shows a schematic structure of an image display apparatus 800 according to an exemplary embodiment.

The image display apparatus 800 includes a light source unit 820 providing light for forming images, and a display panel 840 adjusting the transmittance of the light provided by the light source unit 820 according to image information.

The display panel 840 may have a structure in which a plurality of one of the above-described variable liquid devices are arranged in an array. For example, the display panel 840 may include a first device 841, a second device 842, and a third device 843. The first device 841 may be the variable liquid device 100 that is one of the above-described embodiments, and is configured to include a light transmittable fluid FR displaying a first color. The second device 842 may be one of the above-described variable liquid devices, and may be configured to include a light transmittable fluid FG displaying a second color. The third device 843 may be one of the above-described variable liquid devices, and may be configured to include a light transmittable fluid FB displaying a third color. The first color, the second color, and the third color may be respectively red, green, and blue. Each of the first, second, and third devices 841, 842, and 843 may transmit or block the light incident from the light source unit 820, when driving of an electrode unit is controlled by the image information in each of the first, second, and third devices 841, 842, and 843. Also, in the light transmission mode, the aperture diameter AD may be adjusted, and thus, the first through third devices 841 through 843 may display grayscale images.

Figure 11:
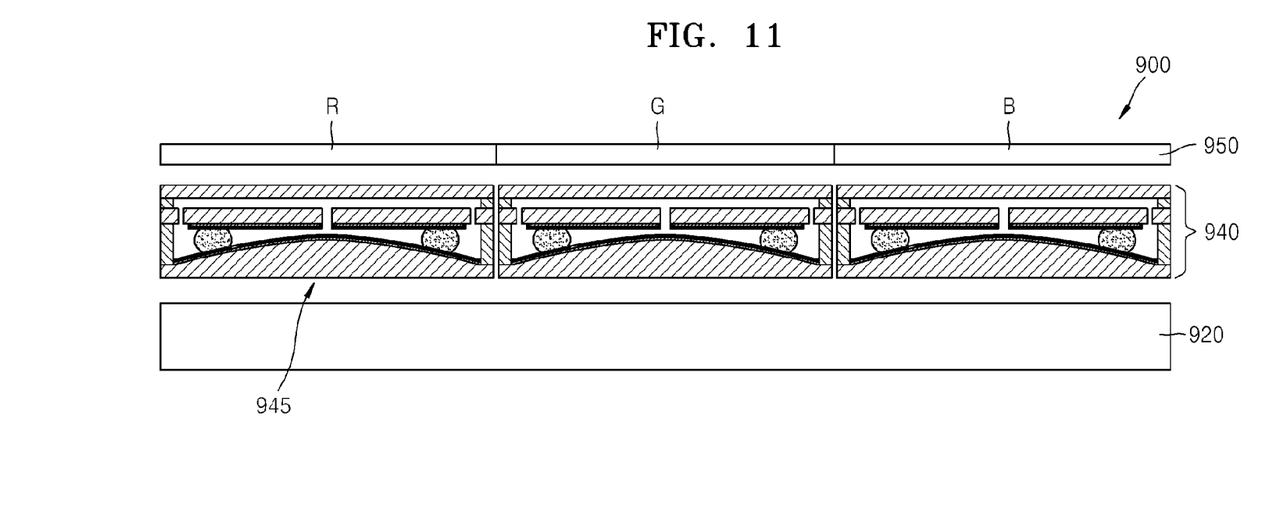
FIG. 11 is a schematic diagram of an image display apparatus according to an exemplary embodiment.

FIG. 11 is a schematic diagram of an image display apparatus 900 according to an exemplary embodiment.

The image display apparatus 900 includes a light source unit 920 providing light for forming images, and a display panel 940 adjusting the transmittance of the light provided by the light source unit 920 according to image information. The display panel 940 may include a structure in which a plurality of variable liquid devices 945 are arranged in an array. The above-described variable liquid devices or modified examples thereof may be used as a variable liquid device 945. The image display apparatus 900 of the present exemplary embodiment additionally includes a color filter 950 for displaying colors. For example, the color filter 950, including color regions R, G, and B corresponding respectively to the plurality of variable liquid devices 945, is disposed on the display panel 940.

In each of the variable liquid devices 945, the driving of an electrode unit is controlled according to the image information so as to transmit or block the light incident from the light source unit 920. In addition, in the transmission mode, the aperture diameter AD may be adjusted to adjust the intensity of the light incident to each of the color regions R, G, and B of the color filter 950, and thus, a grayscale may be represented.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A variable liquid device comprising:
   a chamber comprising a channel structure, in which a fluid flows and which has a variable height in a first channel of the channel structure;
   a first fluid which is filled in the first channel having the variable height and comprises a non-transmissive material, the variable height continuously increasing from or decreasing toward a center axis of the variable liquid device; and
   a second fluid which is filled in the channel structure and comprises a light transmissive material that does not mix with the first fluid,
   wherein an aperture, through which light is transmitted, is adjusted according to a variation of an interface between the first fluid and the second fluid,
   wherein the chamber comprises:
   a first substrate having a curved surface, and
   a second substrate having a planar surface disposed facing the curved surface of the first substrate, to form the first channel having the variable height between the curved surface of the first substrate and the planar surface of the second substrate.

2. The variable liquid device of claim 1, wherein the first fluid moves symmetrically about the center axis of the variable liquid device.

3. The variable liquid device of claim 1, wherein the first fluid is expanded or reduced as a concentric loop in the first channel.

4. The variable liquid device of claim 1, wherein the channel structure further comprises:
   a second channel in which the second fluid flows; and
   a third channel connecting the first channel and the second channel to each other.

5. The variable liquid device of claim 4, wherein the variable height of the first channel is uneven in a direction perpendicular to the center axis of the variable Liquid device.

6. The variable liquid device of claim 4, wherein the variable height of the first channel decreases toward the center axis of the variable liquid device.

7. The variable liquid device of claim 1, wherein the chamber further comprises:
   a third substrate disposed facing the second substrate and apart from the second substrate;
   a first spacer configured to separate the first and second substrates from each other; and
   a second spacer configured to separate the second and third substrates from each other.

8. The variable liquid device of claim 7, wherein the first and second fluids flow in the first channel, which is formed by the first substrate, the second substrate, and the first spacer, and
   the second fluid flows in a second channel, which is formed by the second substrate, the third substrate, and the second spacer.

9. The variable liquid device of claim 7, wherein a through hole is formed in a center portion of the second substrate.

10. The variable liquid device of claim 9, wherein at least one among the first fluid and the second fluid flows along the through hole.

11. The variable liquid device of claim 1, wherein the aperture is a region of the second fluid surrounded by the first fluid.

12. The variable liquid device of claim 1, further comprising:
    an electrode, to which a voltage is applied to form an electric field in the channel structure, and which is disposed on an inner side surface of a channel of the channel structure,
    wherein a location of the interface is changed according to the electric field.

13. The variable liquid device of claim 1, wherein the first fluid is a liquid metal or a polar liquid.

14. A variable liquid device comprising:
    a chamber comprising a channel structure, in which a fluid flows and which has a variable height in a part of the channel structure;
    a first fluid which is filled in the part of the channel structure having the variable height and comprises a non-transmissive material, the variable height continuously increasing from or decreasing toward a center axis of the variable liquid device;
    a second fluid which is filled in the chamber and comprises a light transmissive material that does not mix with the first fluid; and
    an actuator contacting the first fluid and having a size that varies depending on a voltage application,
    wherein an aperture, through which light is transmitted, is adjusted according to a variation of an interface between the first fluid and the second fluid, and
    a location of the interface is changed according to a size of the actuator.

15. A variable liquid device comprising:
    a chamber comprising a channel structure, in which a fluid flows and which has a variable height in a part of the channel structure;

a first fluid which is filled in the part of the channel structure having the variable height and comprises a non-transmissive material, the variable height continuously increasing from or decreasing toward a center axis of the variable liquid device;

a second fluid which is filled in the chamber and comprises a light transmissive material that does not mix with the first fluid; and a reservoir storing a third fluid, wherein an aperture, through which light is transmitted, is adjusted according to a variation of an interface between the first fluid and the second fluid, and a location of the interface is changed according to inflow or outflow of the third fluid into or from a channel in the channel structure.

16. An imaging apparatus comprising:

the variable liquid device of claim 1;

a focusing unit configured to form an image of an object from the light incident through the variable liquid device; and an imaging device configured to convert the image formed by the focusing unit into an electric signal.

17. An image display apparatus comprising:

a light source;

variable liquid devices each comprising:
  a chamber comprising a channel, in which a fluid flows and which has a variable height in a part of the channel,
  a first fluid which is filled in the part of the channel having the variable height and comprises a non-transmissive material, the variable height symmetrically increasing from or decreasing toward a center axis of a respective variable liquid device,
  a second fluid which is filled in the chamber and comprises a light transmissive material that does not mix with the first fluid and forms an interface with the first fluid,
  an adjustable aperture, through which light is transmitted, which is adjusted by varying a location of the interface between the first fluid and the second fluid in the channel, wherein the chamber comprises:
  a first substrate having a curved surface, and
  a second substrate having a planar surface disposed facing the curved surface of the first substrate, to form the part of the channel having the variable height between the curved surface of the first substrate and the planar surface of the second substrate; and a display panel which comprises the variable liquid devices disposed in an array and configured to adjust a transmittance of the light provided from the light source according to image information.

18. The variable liquid device of claim 1, wherein the chamber further comprises:

a third substrate having a surface facing a surface of the second substrate on a side opposing the planar surface, wherein the second fluid flows in a second channel formed between the facing surfaces of the second substrate and the third substrate, and the first fluid does not flow in the second channel.

19. The variable liquid device of claim 18, wherein both of the first and second fluids flow in the first channel.

* * * * *